J. TREANOR.
VEHICLE SPRING SUSPENSION.
APPLICATION FILED NOV. 10, 1917.

1,267,145.

Patented May 21, 1918.

WITNESSES

INVENTOR
James Treanor
BY
ATTORNEYS

UNITED STATES PATENT OFFICE.

JAMES TREANOR, OF NEW YORK, N. Y.

VEHICLE SPRING SUSPENSION.

1,267,145.  Specification of Letters Patent.  Patented May 21, 1918.

Application filed November 10, 1917. Serial No. 201,314.

*To all whom it may concern:*

Be it known that I, JAMES TREANOR, a citizen of the United States, and a resident of the city of New York, borough of Manhattan, in the county and State of New York, have invented a new and Improved Vehicle Spring Suspension, of which the following is a full, clear, and exact description.

The invention relates to automobiles and other vehicles, and its object is to provide a new and improved vehicle spring suspension arranged to minimize jolts and jars incident to the vehicle traveling over uneven or rough portions of the roadway thus insuring easy riding by the occupants seated in the vehicle body. Another object is to permit the use of comparatively light springs.

In order to accomplish the desired result use is made of connected levers fulcrumed on the vehicle body, one of the levers being connected with the axle, and a spring supported on the vehicle body and engaged by another of the said levers.

A practical embodiment of the invention is represented in the accompanying drawing forming a part of this specification, in which similar characters of reference indicate corresponding parts in both views.

Figure 1:
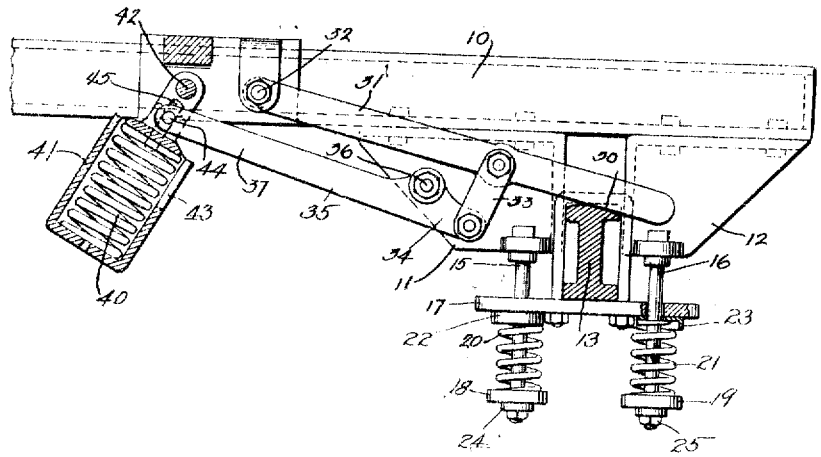
Figure 2:
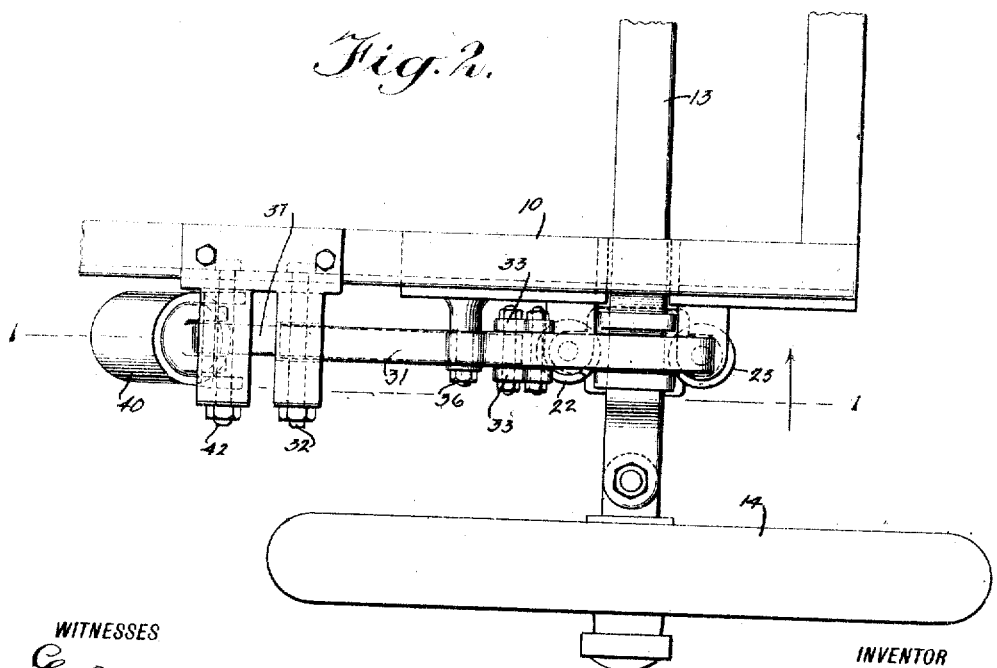

Figure 1 is a sectional side elevation of the vehicle spring suspension as applied, the section being on the line 1—1 of Fig. 2; and Fig. 2 is a plan view of the same.

The vehicle body 10 is provided with depending brackets 11 and 12 spaced apart for the free passage of the axle 13 provided with the usual vehicle wheels 14. The brackets 11 and 12 support depending rods 15 and 16 extending through a plate 17 engaging the under side of the axle 13, and the lower ends of the said rods 15 and 16 are provided with cups 18 and 19 on which rest springs 20 and 21 resting at their upper ends in cups 22, 23 abutting against the under side of the plate 17. On the lower ends of the rods 15 and 16 screw nuts 24, 25 to hold the cups 18 and 19 in place and to allow of adjusting the said cups up or down with a view to increase or decrease the tension of the springs 20 and 21. By the arrangement described the vehicle body 10 is spring supported on the axle 13.

The top 30 of the axle is slightly rounded off and on the top rests the free end of a lever 31 fulcrumed at its other end at 32 on the vehicle body 10. The lever 31 is pivotally connected adjacent its contact with the axle 13 by a link 33 with a short arm 34 of a lever 35 fulcrumed at 36 on the bracket 11. The lever 35 is provided with a long arm 37 resting at its free end on a spring 40 mounted on a support 41 fulcrumed at 42 on the vehicle body 10. The support 41 is provided with a guideway 43 for the outer end of the arm 37, and a pin 44 extends through the outer end of the arm 37 and slidably engages a slot 45 formed in the guideway 43. By the arrangement described a compound lever mechanism is provided between the axle 13 and the main spring 40 mounted on the vehicle body 10, and by the use of this compound lever mechanism the main spring 40 may be made comparatively light thus dispensing with the heavy and cumbersome springs now generally employed for supporting the vehicle body from the axle 13. It is understood that the spring 40 is, however, stronger than the springs 20 and 21 which take up the rebounds. Heavy jolts and jars are taken up by the compound lever mechanism and the spring 40 owing to the axle 13 acting on the short end of the lever 31 which by its link 33 is connected with the short arm 34 of the lever 35.

It is understood that a comparatively short swinging motion given to the lever 31 by the axle 13 causes the long arm 37 of the lever 35 to swing a comparatively long distance thus correspondingly compressing the spring 40.

Having thus described my invention, I claim as new and desire to secure by Letters Patent:—

1. A vehicle suspension, comprising a lever, of which one end is fulcrumed on the vehicle body and its other end engages the axle of the vehicle, a second lever fulcrumed on the vehicle body at a point between its ends, a link connecting one end of the said second lever with the said first-named lever at a point between the ends of the said first-named lever, and a spring supported on the vehicle body and engaged by the other end of the said second lever.

2. A vehicle suspension, comprising a lever fulcrumed at one end on the vehicle body and engaging with its free end a vehicle axle, a second lever fulcrumed near one end on the vehicle body and having a short arm and a long arm, a link connecting the short arm of the said second lever with the said first-named lever at a point adjacent the axle, and a spring supported on the vehicle body and engaged by the terminal of the long arm of the second lever.

3. In a vehicle spring suspension, the combination of an axle, a car body, a light rebound spring device connecting the car body directly with the axle, a lever fulcrumed at one end on the said car body and resting with its free end on the said axle, a second lever fulcrumed near one end on the car body and having a short arm and a long arm, a link connecting the said short arm with the said first-named lever at a point near the said axle, and a spring supported by the said vehicle body and engaged by the said long arm.

JAMES TREANOR.